(12) United States Patent
Iskandar et al.

(10) Patent No.: US 10,812,549 B1
(45) Date of Patent: Oct. 20, 2020

(54) TECHNIQUES FOR SECURE SCREEN, AUDIO, MICROPHONE AND CAMERA RECORDING ON COMPUTER DEVICES AND DISTRIBUTION SYSTEM THEREFORE

(71) Applicant: Apple Inc., Cupertino, CA (US)

(72) Inventors: Edwin Iskandar, Cupertino, CA (US); Johnny Trenh, San Jose, CA (US); Norman Wang, Saratoga, CA (US); Megan Gardner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 259 days.

(21) Appl. No.: 15/175,801

(22) Filed: Jun. 7, 2016

(51) Int. Cl.
*H04L 29/06* (2006.01)
*H04L 29/08* (2006.01)
*H04N 21/81* (2011.01)

(52) U.S. Cl.
CPC .............. *H04L 65/60* (2013.01); *H04L 67/10* (2013.01); *H04N 21/8173* (2013.01)

(58) Field of Classification Search
CPC ...... H04L 65/60; H04L 67/10; H04N 21/8173
See application file for complete search history.

(56) References Cited

U.S. PATENT DOCUMENTS

| | | | | |
|---|---|---|---|---|
| 8,730,251 B2* | 5/2014 | Mathew | ................. | G09G 5/399 345/531 |
| 9,161,006 B1* | 10/2015 | Wang | ....................... | H04N 9/79 |
| 2006/0085795 A1* | 4/2006 | Washizu | ............. | G06F 12/0223 718/100 |
| 2009/0131177 A1* | 5/2009 | Pearce | .................... | A63F 13/10 463/43 |
| 2010/0091025 A1* | 4/2010 | Nugent | .................. | G09G 5/363 345/502 |
| 2011/0164045 A1* | 7/2011 | Costa | .................... | G06F 1/3203 345/502 |
| 2013/0067186 A1* | 3/2013 | Pronovost | ............... | G06F 12/02 711/170 |
| 2014/0179423 A1* | 6/2014 | Deng | .................... | A63F 13/355 463/31 |
| 2015/0087414 A1* | 3/2015 | Chen | ..................... | A63F 13/355 463/31 |
| 2015/0119142 A1* | 4/2015 | Abbott | ................... | G02B 27/01 463/31 |
| 2015/0165322 A1* | 6/2015 | Gault | ...................... | A63F 13/10 463/31 |
| 2016/0030841 A1* | 2/2016 | Perlman | ............. | H04N 21/2143 463/33 |
| 2016/0142741 A1* | 5/2016 | Haot | .................... | H04N 21/234 725/12 |
| 2017/0262952 A1* | 9/2017 | Sarna | ........................ | G06T 1/20 |

OTHER PUBLICATIONS

Purewal "Twitch streaming from your PC guide: Setting up a video stream in OBS". https://www.cnet.com/how-to/the-twitchpc-streaming-guide-setting-up-a-stream-with-video-in-obs/. Jan. 26, 2016 3:31 PM PST (Year: 2016).*

* cited by examiner

*Primary Examiner* — Umar Cheema
*Assistant Examiner* — James Ross Hollister
(74) *Attorney, Agent, or Firm* — BakerHostetler

(57) ABSTRACT

A method of sharing content rendered on a device, including executing an application which generates audiovisual content, retrieving the application's audiovisual content from a graphics memory, and transmitting the retrieved content to a destination device via a network.

28 Claims, 3 Drawing Sheets

300

TECHNIQUES FOR SECURE SCREEN, AUDIO, MICROPHONE AND CAMERA RECORDING ON COMPUTER DEVICES AND DISTRIBUTION SYSTEM THEREFORE

BACKGROUND OF THE DISCLOSURE

The disclosure relates to a system and method for secure live broadcasting of content from computer devices.

Modern computer systems are used for an ever-increasing number of applications. For example, personal computing devices often are used for gaming purposes. Recently, applications have been developed to allow gamers to stream game content to external devices, such as video streaming servers. In this manner, gamers can stream their gameplay experience to others. Twitch.tv, YouTube Live, Mobcrush, and UStream are examples of online video streaming services that may carry gameplay or video data.

Conventional streaming applications, however, are not secure. Such applications typically capture all audio/visual content being generated by a computer system and transmit this content to destination devices, which may pose security and privacy risks. For example, gaming applications typically execute on computer systems in parallel with other applications, such as messaging applications and the like. If a communication application presents a pop up message while a game is being streamed, the contents of the pop up message may be streamed to the destination device (and, by extension, to whomever happens to be viewing the stream) before the gamer can prevent its distribution. In addition, conventional streaming applications are unable to simultaneously stream content from multiple sources on a computer system in a secure manner.

Accordingly, the inventors perceive a need for a system and method to capture content rendered from applications and various sources associated with a device and to broadcast that captured content in a way that maintains user and device privacy and security.

DETAILED DESCRIPTION

Embodiments of the present disclosure provide a system and method for sharing content rendered on a device, including executing an application which generates audio-visual content, retrieving the application's audiovisual content from a graphics memory, and transmitting the retrieved content to a destination device via a network. The methods and systems described herein allow for secure live broadcasting of content rendered on a device. The content may be accessed and broadcast while being rendered without any broadcasting application accessing the application providing the content.

Figure 1:
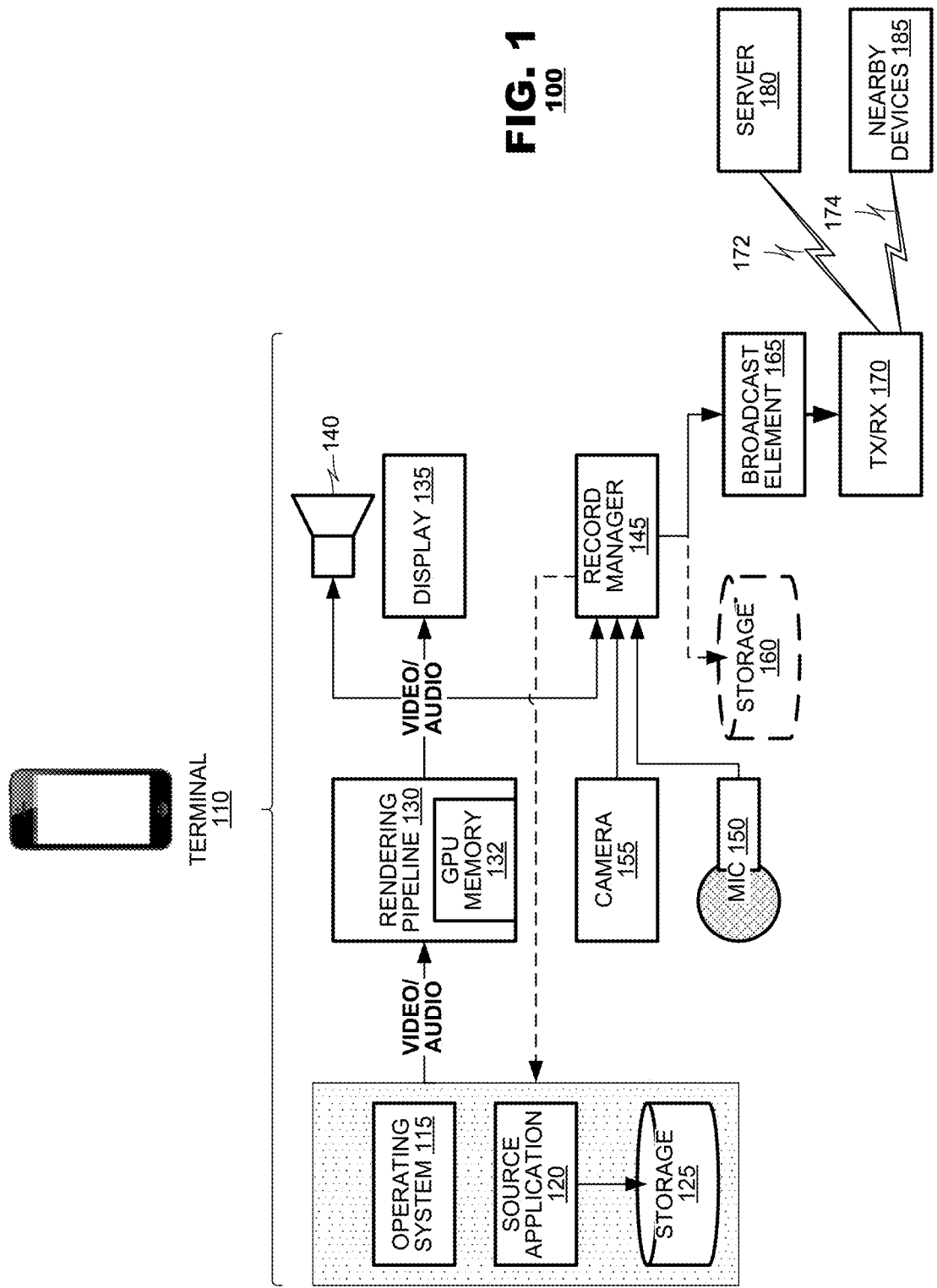
FIG. 1 shows a data flow diagram illustrating signal flow of a streaming system, according to an aspect of the present disclosure.

FIG. 1 is a data flow diagram illustrating signal flow of a streaming system 100 according to an embodiment of the present disclosure. The streaming system 100 may operate within a computing device 110.

Audio visual content may be generated by an application 120 and/or an operating system 115 that executes on the device 110. The audio/visual content may be presented to a rendering pipeline 130, which composites final video content and final audio content to be rendered by a local display 135 and local speakers 140 of the device.

The streaming system 100 may include a recording manager 145 and a broadcast element 165. The recording manager 145 may access audio/visual content of the application 120 from the rendering pipeline 130 and may present the selected audio/visual content to the broadcast element 165. The broadcast element 165 may communicate with a destination device 180, 185 via a transceiver 170 of the device 110 to stream the selected audio/visual content to the device 180, 185.

The rendering pipeline 130 represents a collection of hardware and software resources that generate final video and audio output from a variety of sources within the device 110, such as the application 120 and operating system 115. The rendering pipeline may include Graphics Processing Unit (GPU), associated memory 132 and scheduling units for the GPU (not shown). The GPU memory 132 may be partitioned into multiple memory spaces, each of which may store content associated with a respective application. Thus, the GPU memory 132 may have a memory space for storage of audio/video content of application 120 which is discrete from memory spaces that may store audio/video content of other applications (not shown) that execute on the device 110. Thus, the recording manager 145 may access a GPU memory space of an application that is selected for streaming without accessing memory spaces of other applications that are not to be streamed.

FIG. 1 illustrates data flow as is relevant to the streaming operations described herein. In practice, a rendering pipeline 130 also may receive other inputs, such as audio data captured by a microphone 150 and/or video data captured by a camera 155. Data flows between the rendering pipeline 130 and these other sources are not illustrated in FIG. 1 so as not to obscure the data flows that are relevant to the present discussion.

The recording manager 145 may select audiovisual content from the rendering pipeline 130 for streaming. The selection may be based on a user selection or settings associated with a source application 120. The recording manager 145 may execute as an application, which can be configured by user command to select content of other application(s) that should be streamed. Once so configured, the recording manager 145 may retrieve content of the selected applications from the rendering pipeline 130 and forward it to the broadcast element for streaming. The recording manager 145 may retrieve the content from segmented memory 132 within the rendering pipeline, which may avoid capture of content from other applications that are not to be streamed.

In an embodiment, recording manager 145 also may stream content from one or more sources as selected by a user or based on settings associated with the sources. For example, the recording manager 145 may be configured to integrate camera content into gameplay content before streaming. In this case, the recording manager 145 may generate composite or picture-in-picture video content from the video content of the application 120 and video content provided by a camera 155. Alternatively, the recording manager 145 may generate final video content by merging gameplay video with other video sources (locally stored pictures, for example). Similarly, the recording manager 145 may merge audio content from multiple sources—game audio, locally stored audio and/or microphone input—into a final audio content that is streamed. In practice, the recording manager 145 itself may execute as an application on the device. It may read content from the rendering pipeline 130 and data from secondary sources to synthesize final output content that is transferred to the broadcast element 165 for streaming. To prevent the recorded application from accessing all user actions and content rendered or captured with the device 110, the recording manager 145 may access only content provided by the rendering pipeline 130 from the GPU memory 132 and/or from secondary sources. This may prevent the recorded application from recording actions on the device for its own purposes.

In an embodiment, the recording manager 145 also may store streamed content to local storage 160 based on a user command or device settings. Storing the streamed content permits gamers to retrieve the streamed content for later review and/or editing. Alternatively, the recording manager 145 may store the retrieved audiovisual content in a storage unit 125. Storage may occur before transmitting the rendered content, during the transmission of the rendered content, and/or after the transmission of the rendered content.

In another embodiment, the recording manager 145 may be denied access to different types of content that are designated as secured. Secured content may be identified, for example, based on a type of application that generates the content, based on types of information stored by the device or by other designators provided by a user of the devices. For example, an operating system may provide controls to a user that allows the user to select installed applications to which the recording manager 145 either is granted or is denied access. Similarly, the operating system may provide controls that allows a user to specify types of content (for example, photos, e-mails, text messages) to which the recording manager 145 either is granted or is denied access. The operating system 115 may grant or deny the recording manager 145 access to content as determined by user configuration settings.

The broadcast element 165 may be an application that coordinates data transfer to other devices 180, 185. In cases where the destination device is a server 180 for a service that offers video streaming services to their subscriber base, the broadcast element 165 may be an application published by a proprietor of the service. In cases where the destination device is a nearby device 185 that is connected by a short distance communication network (e.g., Bluetooth of the like), the broadcast element 165 may be a process within a device's operating system that coordinates data transfer with the nearby device 185; Apple's Airplay protocol is an example of one such process.

Moreover, the broadcast element 165 may provide application extensions that permit a degree of user control over the streaming operations. In one aspect of the disclosure, the broadcast element 165 may provide a user interface to be initiated. A user may sign into to the broadcast element 165 via the user interface. In another aspect, the user interface may allow for uploading audiovisual content from the record manager 145. The broadcast element 165 also may not access the source application 120 whose content is being rendered and retrieved in order to protect user, source application 120, and device 110 privacy. In another aspect, the broadcast element 165 may return data to the application regarding the broadcast, such as chat data, broadcast statistics, broadcast characteristics, and other information. The user may select whether to see the data in an overlay or in a separate window on the display 135. Alternatively, the data may be stored in the storage unit 160 for future viewing.

The recording manager 145 also may provide user controls that govern streaming operations. For example the recording manager 145 may provide user controls through which a user may select different element(s) of audiovisual content for streaming. For example, the retrieved audiovisual content may include only content associated with a particular source application 120 being executed. Alternatively, the retrieved audiovisual content may include content associated with multiple source applications 120 being executed. In still other cases, a user selection may cause the recording manager 145 to retrieve all content being rendered on the device 110. In another embodiment, where the terminal 110 renders video on multiple display devices, the recording manager may permit a user to select, on a display device basis, which audiovisual content is to be streamed, whether the content of a single display device, the content of all display devices, or the content of some intermediate set of devices.

Additionally, the recording manager 145 may provide user controls to select audio-visual elements for streaming that are not currently being rendered via the rendering pipeline 130. For example, users may select video data from a camera 155 and/or audio data from a microphone 150 for streaming, even if the video or audio data is not included in the audio-visual content that is being rendered on the display 135 or speaker 140. The recording manager 145 may provide user controls to selectively enable and disable streaming of microphone data and/or camera data during streaming.

In another aspect, the camera 155 may be associated with a user interface to preview content captured by the camera 155 and to allow the user to select whether to broadcast camera content. The camera preview user interface may be rendered without providing the camera content to the recording manager 145.

The broadcast element 165 may manage communication with the destination device 180, 185. The broadcast element 165 may transmit the retrieved audiovisual content to destination device 180, 185 with the transceiver 170. To establish this communication with a server 180, the broadcast element 165 may authenticate the device 110 with the server 180. To facilitate the streaming of content from the device 110 to the server 180, the broadcast element 165 may initiate a streaming session between the device 110 and the server by opening a communication channel 172. To establish communication with a nearby device 185 such as a locally connected display, the broadcast element 165 may use a streaming service such as AirPlay to arrange for the nearby device 185 to receive content to be rendered on the display. The streaming session may be user controlled or controlled by settings associated with the application or device providing the content. For example, a user may select which application(s) or content source(s) to stream, which content to stream, and where to stream the content. The broadcast element 165 may adjust the transmission of the stream based on host device settings, network settings, user settings, and recipient device settings. For example, one version of a stream may be provided to a server 180, while a different version of the stream may be provided to nearby devices 185. When recording ends, the broadcast element 165 may terminate the communication with the destination devices 180, 185.

A variety of communication channels 172 find application with embodiments of the present disclosure, which may vary based on the type of destination device 180, 185 to which the terminal 110 communicates. For example, the terminal 110 may stream video to destination devices via wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum. In another aspect, the system 100 also may use a communication channel or service 174 such as AirPlay to transmit data between supported devices 185.

In one aspect of the disclosure, the device 110 may be a mobile phone, computer, tablet, or other device capable of rendering audiovisual content. In another aspect of the disclosure, the retrieved audiovisual content can be broadcast live while the source application 120 is being rendered on the device 110. A transceiver 170 (TX/RX in FIG. 1) may transmit the retrieved audiovisual content to a server 180 and/or to one or more nearby devices 185 and/or servers 180.

Figure 2:
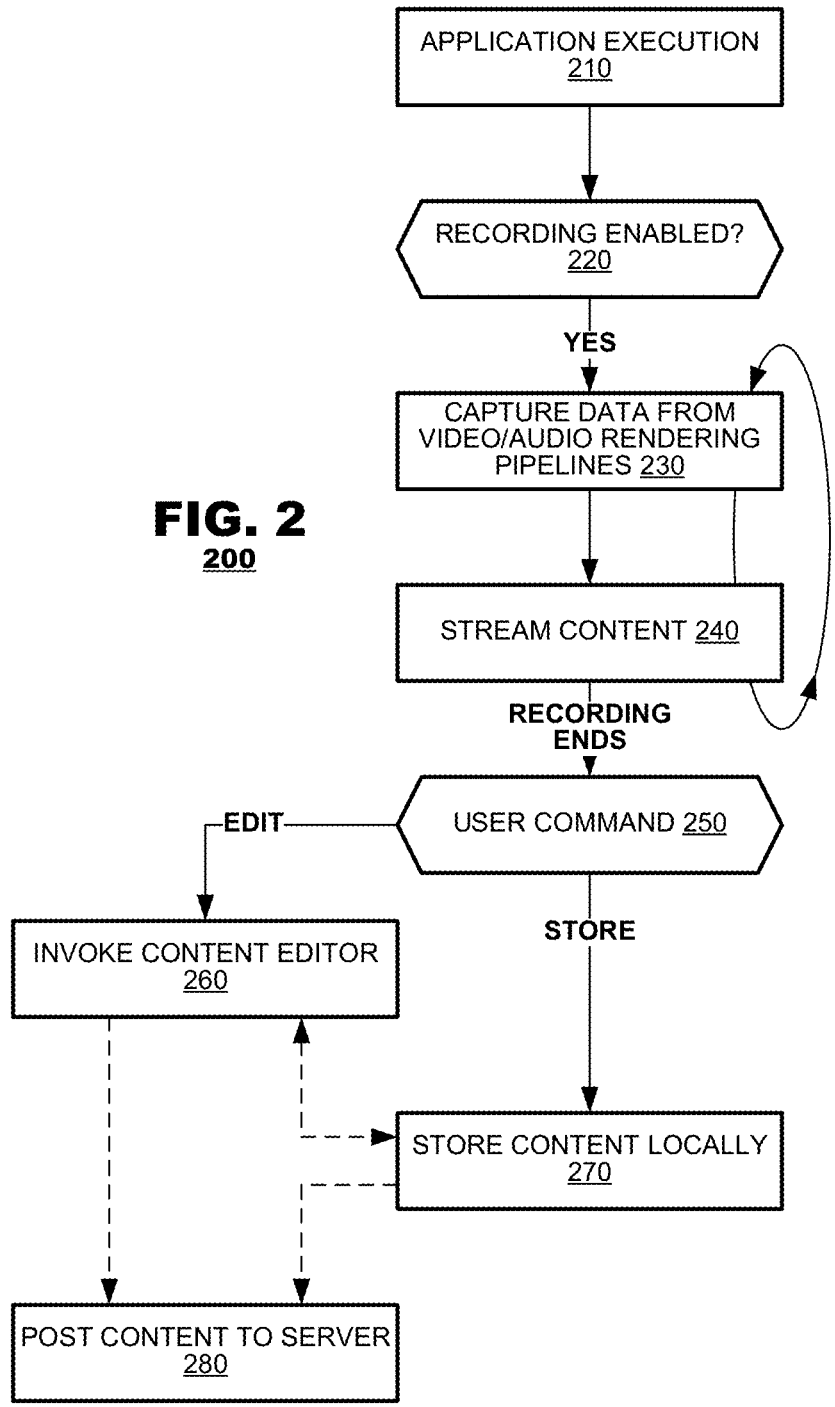
FIG. 2 shows a method of capturing and broadcasting rendered content on a device, according to an aspect of the present disclosure.

FIG. 2 shows a method 200 of capturing and broadcasting rendered content on a device, according to an aspect of the present disclosure. An application may be executed on a device (box 210). While the application is being executed, the method 200 may determine whether recording of audiovisual content from the application is enabled (box 220). If the recording of audiovisual content is enabled, the application's audiovisual content may be captured (box 230) and streamed (box 240) to a destination device. The operations of boxes 230 and 240 may repeat until recording ends to provide live broadcasting of rendered audiovisual content of the application.

When recording ends, the method 200 may determine whether a user command has been entered to process the streamed data further (box 250). For example, a user may enter a request to edit the streamed video, in which case the method 200 may invoke a content editor (box 260) and provide a copy of the streamed content to the editor. Alternatively, a user may command the device to store the streamed content, in which case, the method 200 stores the content locally (box 270). At some later point, the method 200 may post stored or edited content to a server (box 280), which may be the same or different than the destination device to which content was streamed in box 240. In one aspect, edited content in the content editor may be secure so that the recording application 145 may not access it.

In one aspect, a determination of whether recording is enabled (box 220) may be made based on operating system settings. In another aspect, the determination of whether recording is enabled (box 220) may be made based on a user command. A user may, for example, send an instruction to invoke a recording manager 145 (FIG. 1). If the recording manager 145 is enabled, signaling that recording has been enabled (box 220), the method 200 may capture content rendered from an application (box 230).

In an embodiment, data capture (box 230) may include reading data from segmented memory of a rendering pipeline that is associated with the application(s) that are selected for streaming. As part of this operation, the capture operation may include confirming that the selected applications has been approved for streaming; if data from a selected application were designated as secure against streaming, for example, in settings data on the device, then the secure data would not be captured.

In one embodiment, invoking a content editor (box 260) may include executing an application to modify captured content. The content editor may be able to combine content from multiple applications and/or inputs. The content editor may allow for selection of portions of the content to be stored (box 260) and/or posted (box 280). The content may allow for adding or removing of sound, video, images, text, and the like.

In another embodiment, storing the content locally (box 270) may include storing content in a storage unit 160 (FIG. 1). Storing content may include storing the content before posting the content to a server (box 280) and/or before invoking a content editor (box 260). Alternatively or in addition, the content may be stored after it has been edited (box 260).

In a further embodiment, posting the content to a server (box 280) may include transmitting the content to a server 180 via a communication channel 172 (FIG. 1). Alternatively, content may be posted to a destination device 185 (FIG. 1). Posting content may occur as the content is being rendered and/or after the content has been rendered. Edited content may be posted while the original content is being rendered and/or after the original content has been rendered. Posting can occur while the content is being recorded and captured, and/or may occur after the content has been recorded and captured.

Figure 3:
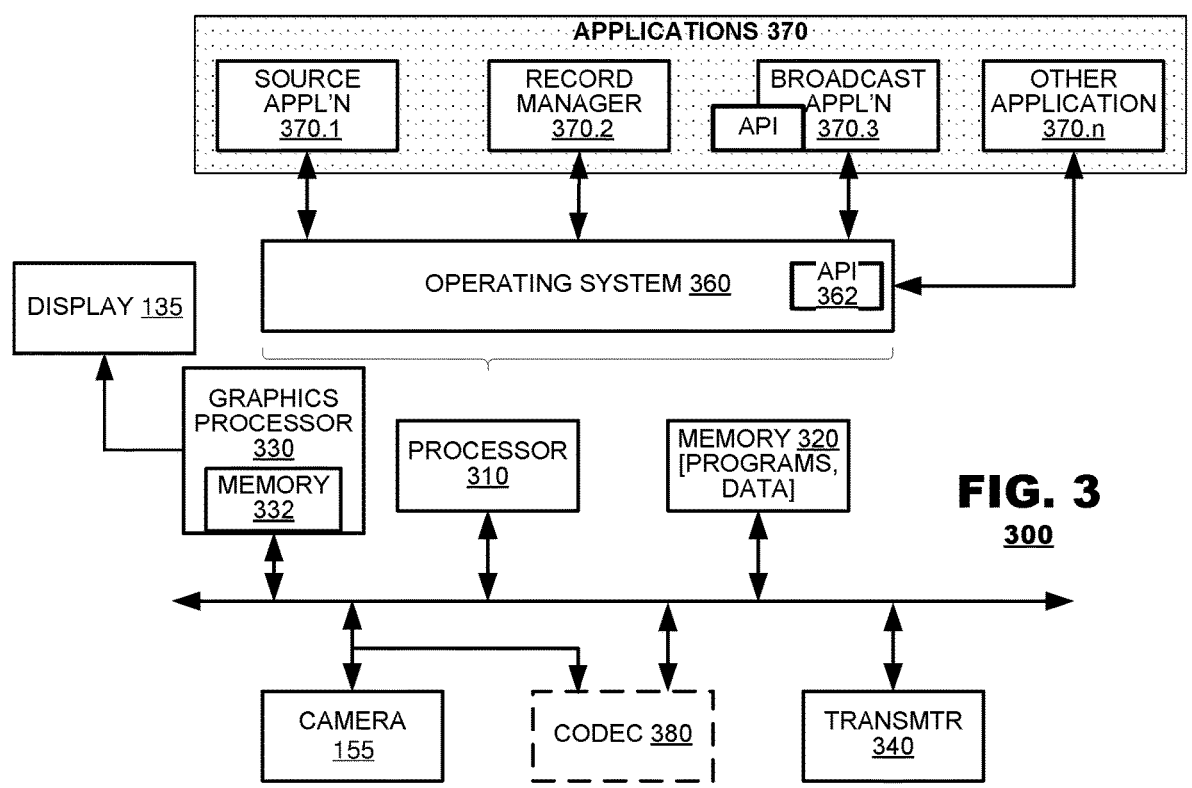
FIG. 3 illustrates a system for capturing and broadcasting rendered content on a device, according to an aspect of the present disclosure.

FIG. 3 illustrates a system 300 for capturing and broadcasting rendered content on a device, according to an aspect of the present disclosure. The system may include a processor 310, a memory system 320, a graphics processing unit (GPU) 330, a transmitter 340 and a display 135. The memory system 320 may store program instructions that define an operating system 360 of the device and a variety of application programs 370, including a source application 370.1, a recording manager 370.2, and a broadcast application 370.3, which are executed by the processor 310.

During operation, application execution may cause video data to be stored in a memory 382 of the GPU 380. The GPU memory 332 may be segmented into multiple memory spaces (not shown) to store visual content as needed of the different applications 370.1, 370.n. The visual content stored in the GPU memory 332 may be composited into a final video output of the system 300 and rendered on the display 135.

The recording manager 370.2 may execute as another application on the system 300. It may read data from the GPU memory 382 associated with the application(s) 370.1 that are to be streamed and may present them to the broadcast application 370.3. The broadcast application 370.3 may cause the streamed video data to be streamed from the system 300.

The system 300 may include other sub-systems to facilitate the video streaming. For example, the system 300 may include a codec 380, which may apply compression operations on the streamed audiovisual data to reduce its bitrate. The coded 380 may be provided as a hardware component, separate from the processor 310, or it may be provided as another application (not shown) that is executed by the processor 310.

As described, the transmitter 340 may stream captured content to other devices (180, 185 in FIG. 1). The transmitter 340 can include, for example, a wireless antenna and associated circuitry capable of data transmission with the mobile data network utilizing at least one data transmission protocol, such as, for example, 3G, 4G Long Term Evolution (LTE), 5G, Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, AirPlay, a communication channel as defined herein, AirPlay, and/or the like, and/or combinations thereof.

The system 300 may include one or more applications 370. The applications 370 and operating system 360 are program instructions that may be stored in the memory 320 and executed by the processor 310. The program instructions of the applications 370 and operating system 360 may include content to be rendered, recorded, and/or broadcast. A graphics processor 330 may store this content.

In one aspect, the applications 370 may include a source application 370.1. The source application 370.1 may provide audiovisual content to be rendered, recorded, and broadcast. A record manager 370.2 may retrieve content from the source application 370.1. In one aspect, the record manager 370.2 may retrieve the audiovisual content from the graphics processor 330. The record manager 370.2 may provide retrieved content to the broadcast element 370.3. The broadcast element 370.3 may include one or more Application Program Interfaces (API) build applications and instructions for execution. In one aspect, an API specifies how software components should interact and APIs are used when programming graphical user interface (GUI) components. In another aspect, the system 300 may include a codec application 370.4 to perform encoding and/or decoding operations.

In another aspect, the operating system 360 may include an API 362 to facilitate interaction between the applications 370.1-370.4. The operating system 360 may allow the record manager 370.2 to retrieve audiovisual content from the source application 370.1. The operating system 360 also may allow the broadcast element 370.3 to broadcast the retrieved audiovisual content. The operating system 360 also may facilitate coding and decoding of content.

In one aspect, the source application 370.1 may be an electronic application or software application configured to provide gamification services. The source application 370.1 may be written in any programming language, such as, for example, C, Java, Objective-C, C+, Python, Visual Basic, Perl, or any other programming language the processor 310 is capable of executing. The types of gamification services managed by the source application 370.1 may include games, music, videos, social media applications, and the like.

In another aspect, audiovisual content may be provided by an input device such as a camera 155. Alternatively or in addition, the input device may be a microphone 150 (FIG. 1). Content captured by inputs also may be retrieved by the record manager 370.2. Content captured by inputs may be rendered by an output device like a display 135 and/or a speaker 140 (FIG. 1).

Captured content from inputs may be provided to a codec 380 for coding. Coding settings may be automatically determined by the device based on device settings or may be determined by a destination device to which the content is broadcast.

In one aspect of the disclosure, the processor 310 may be associated with a touchscreen controller, one or more communications components, one or more graphics components, one or more contact/motion components, and the like. The processor 310 can include, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute the source application 370.1 and to facilitate the transmission of data.

In one aspect, the memory 320 may be configured to store, for example, the source application 120, device information, user information, and the like. In one aspect, the memory 320 may be configured to store, for example, the retrieved audiovisual content. For the purposes of this disclosure, the memory 320 may store computer data, which may include computer program code that may be executable by the processor 310 in machine readable form. By way of example, and not limitation, the memory 320 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a memory 320 or machine readable medium, which may be incorporated into a computer program product.

The display 390 may be a light-emitting diode display (LED), an electroluminescent display (ELD), a plasma display panel (PDP), a liquid crystal display (LCD), an organic light-emitting diode display (OLED), or any other display technology. In another aspect, the display 390 may display broadcast content and/or information regarding broadcast content. For example, one or more additional display windows may show the content that is being broadcast, which may be a subset of the content being rendered, a mix of content from multiple sources, or edited content. In another example, the display 390 also may display information about the broadcast content, including but not limited to type of content broadcast, length, format, number of viewers, specific viewer information, locations where the content is being broadcast, a type of broadcast element 370.3 used, comments from viewers, likes, and other information.

In this disclosure and in the claims it is to be understood that reference to a terminal or wireless device is intended to encompass electronic devices such as mobile phones, controllers, tablet computers, personal computers, PDAs, and the like. A "terminal" or "device" is intended to encompass any compatible mobile technology computing device that can connect to a wireless communication network. A device further includes mobile phones, mobile equipment, mobile stations, user equipment, cellular phones, smartphones, handsets, or the like (e.g., Apple iPhone), wireless dongles, remote alert devices, or other mobile computing devices that may be supported by a wireless network. The term "device" may be interchangeably used and referred to herein as "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone and messaging services through the use of a wireless device, such as the Global System for Mobile Communication (GSM) network, Code-Division Multiple Access (CDMA) network, Long-Term Evolution (LTE) network, 5G (Fifth Generation), and the like that may utilize the teachings of the present application to transmit and process short message data services.

Reference in this disclosure to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the disclosure are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

Further in accordance with various aspects of the disclosure, the methods described herein are intended for operation with dedicated hardware implementations including, but not limited to processors, microprocessors, PCs, PDAs, SIM cards, semiconductors, application specific integrated circuits (ASIC), programmable logic arrays, cloud computing devices, and other hardware devices constructed to implement the methods described herein.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi‑Carrier (IMT‑MC)), Wireless Fidelity (Wi-Fi), Bluetooth, AirDrop, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

The aspects in the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channel 172.

Aspects in the disclosure may be implemented in any type of mobile smartphones that are operated by any type of advanced mobile data processing and communication operating system, such as, e.g., an Apple™ iOS™ operating system, or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure may include a server 180 executing an instance of an application or software configured to accept requests from a client and giving responses accordingly. The server 180 may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server 180 may include peripheral devices that may allow information to be retrieved from an external source, and the result of operations saved and retrieved. The server 180 may operate within client-server architecture. The server 180 may perform some tasks on behalf of clients. The clients may connect to the server 180 through the network on a communication channel as defined herein. The server 180 may use memory with error detection and correction, redundant disks, redundant power supplies and so on.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

We claim:

1. A method of sharing content rendered on a device, comprising:
    executing, on a first device associated with a first user, a plurality of rendering applications which render visual content by a graphics processing unit (GPU), each of the plurality of rendering applications storing its respective visual content rendered by the same GPU in a respective partition of a shared memory, wherein each respective partition is a memory space dedicated to its respective application;
    selecting first application(s) of the plurality of rendering applications for streaming to a second user;
    generating a display output of the first device from the visual content stored in the partitions of a second plurality of the rendering applications;
    retrieving the selected application's visual content from the selected first application(s)' respective partition(s); and
    transmitting, by a broadcast application the retrieved content to a destination device associated with the second user via a network,
    wherein an operating system limits access of applications to the partitions of other applications stored in the shared memory, and, upon the selecting, the operating system grants the broadcast application access only to the partitions of the selected first application(s).

2. The method of claim 1, wherein the shared memory is a memory space of a graphics processing unit.

3. The method of claim 1, further comprising merging the selected application's audio-visual content with camera content prior to the transmitting.

4. The method of claim 1, further comprising merging the selected application's audio-visual content with microphone content prior to the transmitting.

5. The method of claim 1, further comprising storing the retrieved content on the device.

6. The method of claim 5, further comprising activating a content editor after transmitting the retrieved content.

7. The method of claim 1, wherein the destination device is a server.

8. The method of claim 1, wherein the destination device is a locally connected display.

9. A computing device, comprising:
    a processor;
    a graphics processing unit (GPU);
    a memory system including a storage space for program instructions and a storage space for audio-visual content, the program instructions defining:
        a first application rendering first audio-visual content by the GPU, which is stored in a first dedicated space of the memory system, wherein the first dedicated space being associated with the first application;
        a second application rendering second audio-visual content by the same GPU, which is stored in a second dedicated space of the memory system separate from the first dedicated memory space, wherein the second dedicated space is associated with the second application;
        a third application that streams selected rendered content to a destination device via a network; and
        a fourth application, separate from the third application, that selects between the first and second application, retrieves rendered content from a dedicated space associated with the selected application, and provides the selected rendered content to the third application; and
    a display output for displaying content stored in both the first dedicated space and the second dedicated space;
    wherein an operating system limits access to the first dedicated memory space and the second dedicated memory space of the first and second applications, and, upon the selecting, the operating system allows the third fourth application to access only the selected application's dedicated memory space.

10. The system of claim 9, wherein the memory system is segmented with different memory spaces for audio-visual content.

11. The system of claim 9, further comprising one or more input devices to provide content to be rendered.

12. The system of claim 11, wherein the one or more input devices includes a camera.

13. The system of claim 11, wherein the one or more input devices includes a microphone.

14. The system of claim 9, further comprising a content editor for editing the retrieved content.

15. The system of claim 9, further comprising a server to receive streamed content.

16. A non-transitory computer readable medium storing program instructions that, when executed by a processing device, cause the device to:
    select first rendering application(s) of a plurality of rendering applications for streaming;
    rendering, with a graphics processing unit (GPU) of the device, visual content of each of the plurality of rendering applications into respective memory spaces of the GPU, wherein each memory space is dedicated to its respective rendering application;
    generating a display output of the device from the visual content stored in the partitions of a second plurality of the rendering applications
    read the visual content rendered for the selected first rendering application(s) from the memory space(s) of the GPU that is dedicated to the selected application(s); and
    transmit, by a broadcast application, the read content to a destination device, wherein an operating system limits access to the partitions of the first rendering application(s) and, upon the selecting, the operating system allows the broadcast application to access only the partitions of the selected application(s).

17. The medium of claim 16, the instructions further causing the device to merge the application's audio-visual content with camera content prior to the transmitting.

18. The medium of claim 16, the instructions further causing the device to merge the application's audio-visual content with microphone content prior to the transmitting.

19. The medium of claim 16, the instructions further causing the device to store the read content on the device.

20. The medium of claim 16, the instructions further causing the device to activate a content editor after transmitting the retrieved content.

21. The medium of claim 16, wherein the destination device is a server.

22. The medium of claim 16, wherein the destination device is a locally connected display.

23. The method of claim 1, further comprising:
retrieving from the shared memory the combined content in the plurality of partitions for presentation on a display.

24. The method of claim 1, wherein the selecting an application is based on a user selection or settings associated with the plurality of applications.

25. The computing device of claim 1, wherein the operating system includes controls for which types of visual content the access is granted to the broadcast application.

26. The method of claim 1, further comprising:
granting, by an operating system and to a recording manager application, access to content of the selected application, wherein the recording manager application performs the retrieving.

27. The device of claim 1, wherein the broadcast application is associated with a streaming service.

28. The method of claim 1, wherein the shared memory is associated with the single GPU, each partition is associated with the single GPU, and the operating system grants access to the selected application's respective partition.

* * * * *